May 19, 1970     T. J. KNIFF     3,512,838
PICK-TYPE MINING TOOL
Filed Aug. 8, 1968     2 Sheets-Sheet 1
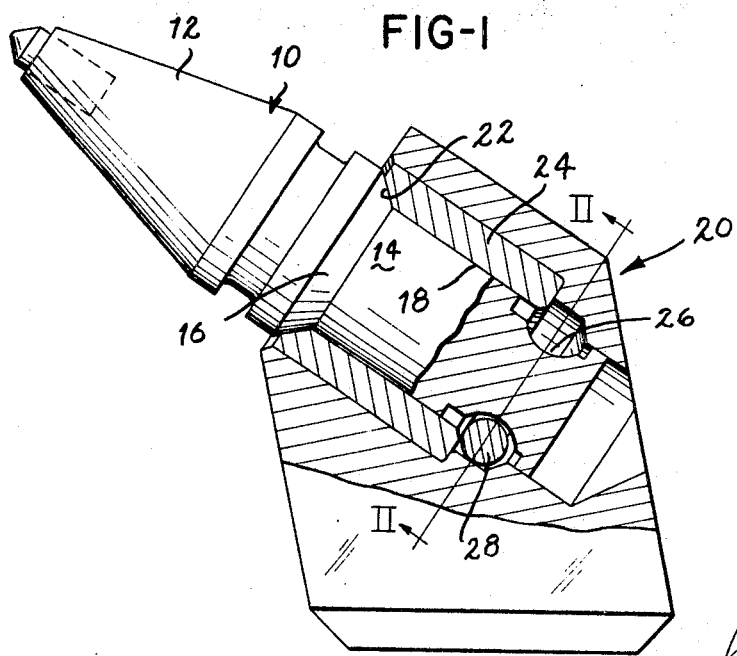
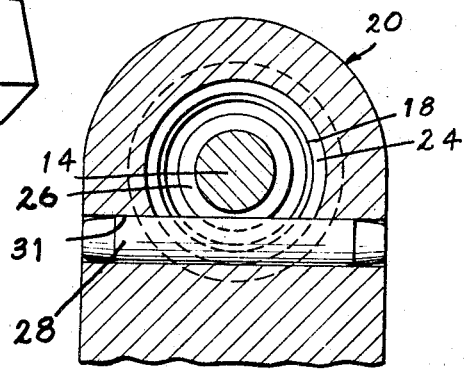
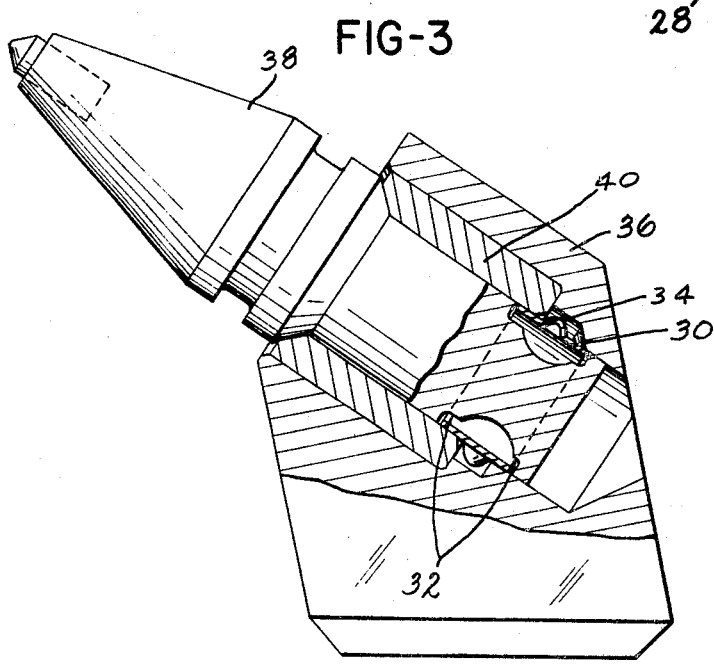
INVENTOR.
THOMAS J. KNIFF
BY
*Melvin A. Crosby*

May 19, 1970     T. J. KNIFF     3,512,838
PICK-TYPE MINING TOOL

Filed Aug. 8, 1968     2 Sheets-Sheet 2

INVENTOR.
THOMAS J. KNIFF
BY

United States Patent Office 3,512,838
Patented May 19, 1970

3,512,838
PICK-TYPE MINING TOOL
Thomas J. Kniff, Bedford, Pa., assignor to
Kennametal Inc., Latrobe, Pa.
Filed Aug. 8, 1968, Ser. No. 751,096
Int. Cl. E21c 35/18
U.S. Cl. 299—86                                          7 Claims

ABSTRACT OF THE DISCLOSURE

Mining tool of the pick-type in which a pick-type bit is mounted in a holder so as to be rotatable on the axis of the shank of the bit and wherein a hard wear-resistant bushing is provided in the holder forming the seat on which the bit bears and also forming at least a portion of the sidewall of the socket in which the bit shank rotates.

---

The present invention relates to mining tools or bits of the pick type and to support blocks therefor and is particularly concerned with a bearing arrangement for a pick-type mining tool or bit and the retention of the bit in the support block.

In the United States application, Ser. No. 479,094, filed Aug. 12, 1965, in the names of Engle and Goodfellow and assigned to the same assignee as the present application, there is shown a pick type mining tool or bit mounted in a support block so the tool will rotate in use. The rotation of the tool is of great merit because the wear on the tool is distributed peripherally thereof and the tools stay sharp and symmetrical and in good cutting condition down to the very end of the hard metal carbide insert in the tip end of the tool.

Rotation of the tool in its block, however, causes wear of the block and of the tool shank and it sometimes occurs that the tool shank will break off before the tool is worn out, and, furthermore, the block will sometimes wear out prematurely, particularly, since it is normally expected to last for the life of several tools. These problems are not encountered when the tool does not rotate in the block but the distinct advantage of the tool remaining sharply pointed throughout its life is lost when the tool does not rotate while it is being used.

With the foregoing in mind, the present invention proposes a tool and block construction of such a nature that the heretofore encountered defects referred to above are substantially eliminated.

A particular object of this invention is the provision of a structure for a pick-type bit so mounted in a support block as to rotate therein when the tool is working and in which any tendency of the tool or bit to break off is greatly reduced.

Another particular object of this invention is the provision of a support block for a rotatable pick type tool or bit in which the tool rotation does not wear the block rapidly whereby the block will have long life and will outwear many tools.

The objects and advantages of the present invention will become more apparent upon reference to the following detailed specification wherein reference is made to the accompanying drawings, wherein:

FIG. 1 is a view, partly in section, of a pick-type mining tool or bit mounted in a support block;

FIG. 2 is a sectional view indicated by line II—II on FIG. 1;

FIG. 3 is a view like FIG. 1 but shows another type of element to retain the tool in the block;

Figure 4:
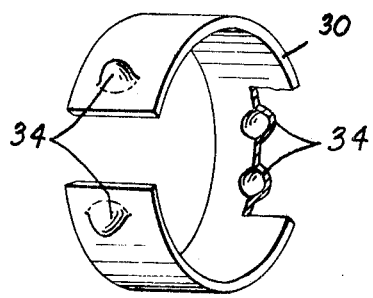
FIG. 4 is a perspective view, partly broken away, showing the tool retaining member of FIG. 3.

In the drawings, in FIGS. 1 and 2, the pick-type tool or bit is designated 10. This tool has a conical head 12 and a cylindrical shank 14 coaxial with head and joined thereto via a flared seat engaging portion 16. A hard metal-insert 18 is mounted in the outer tip end of head 12. This insert may be any hard wear-resistant material, preferably a metal or alloy thereof, and advantageously comprises a hard metal carbide, such as tungsten carbide, which is extremely wear resistant.

Shank 14 of the tool extends into cylindrical bore 18 of support block 20. Block 20 is adapted for being supported on a drum, or chain, or other driving support member and may be connected thereto by welding. Bore 18 of block 20 has a tapered seat 22 at the mouth end which is engaged by flared portion 16 of the tool. The seat 22 of the block and flared seat engaging portion 16 of the tool provide for firm support of the tool during the working thereof and tends to hold the tool with its shank centered in bore 18 so the tool will rotate in the block when it is being used. Rotation of the tool in the block distributes the wear from the material being worked by the tool around the periphery of the tool and thereby maintains the tool in a sharp-pointed condition throughout the life thereof.

It will be evident, however, that the rotation of the tool, particularly since fine grit is nearly always present in the region of the tool, will cause abrasion of the tool and block, particularly at the seat and the shank of the tool adjacent to the seat. This wear will cause the shank to become somewhat loose fitting in the area adjacent the seat in the bore in the block, and the tool will tend to flex in the block under load and the shank will be stressed at a substantially higher degree than when the shank fits the bore in the block fairly closely. The shanks sometimes break for this reason and the blocks sometimes wear to the point that replacement thereof is necessary.

The present invention proposes to provide the blocks with a hard seat which will resist the abrasion referred to above so the blocks will have substantially longer life. The hard seat is provided for by an insert of hard material pressed or otherwise fixed in place in the block. The insert can be hardened steel or it may comprise a cemented metal carbide, such as tungsten or titanium carbide or the like. Steel inserts can be threaded or pressed into the bores in the blocks while carbide inserts are pressed or brazed in the bores. The inserts, in addition to providing for hard seats to be engaged by the tapered seat engaging portions of the tools, also provide hard liners for at least that portion of the bores in the blocks that are subjected to wear by rotation of the tool shanks therein.

The hard inserts, in addition to providing for wear resistance as referred to above, form smooth, polished bearing surfaces so the tools rotate freely thereon and are, as described above, maintained sharp throughout their life. Since the bores of the blocks tend to wear principally on one side and to become unround, wearing of the blocks will interfere with the free rotation of new tools placed in old blocks. With hardened inserts in the bores of the blocks according to the present invention, the blocks will support the tools so they will rotate freely, even when the blocks are quite old, namely, even after the blocks have been used for a great many tools. In FIG. 1, the insert is in the form of a sleeve 24 which is pressed or brazed into the blocks and which surrounds a substantial length of the tool shank. The insert has the seat 22 formed thereon which is engaged by the tapered seat engaging portion of the tool. Sleeve 24 is of cemented carbide or hard steel, preferably the former.

Shank 14 of the tool has an annular groove 26 therein near the end of the shank remote from the head 12. This groove loosely receives a retaining member in the form of pin 28 which is fixed in a lateral bore 31 of block 20 so as to intersect bore 18 and loosely engage groove 26. The loose fit of pin 28 in groove 26 retains the tool in the block but does not in any way interfere with the free rotation of the tool in the block. The location of groove 26 in shank 14 is important because it provides for the maximum length for sleeve 24 and the maximum length of shank 14 in the sleeve thereby to provide for the best support for the tool with the least chance of the tool binding in the block. The substantial length from the seat 22 to the groove gives a long moment arm to support bending forces and keeps the forces acting at the reduced diameter grooved region of the shank to a minimum. The tendency for the shank to snap off at the groove is thereby substantially reduced over prior art structures wherein the groove was disposed intermediate the ends of the shank.

In FIG. 3, the same combination is shown except that, instead of the retaining member being in the form of a pin, it is in the form of a resilient ring 30, snapped into the cylindrical extension 32 of the groove in the shank. This ring, as will be seen in FIGS. 3 and 4 is split and has protuberances 34 extending outwardly thereon. These protuberances will engage the inner end of the liner sleeve in the bore of the block when the tool is in working position therein. The depth of the groove in the tool shank is of sufficient depth, relative to the radial thickness of the ring 30 together with its protuberances 34, that the ring will contract into the groove when the tool shank is pushed into the bore of the block or is pulled therefrom thereby permitting the tool to be mounted in the block or removed therefrom with comparative ease. At the same time, the tool will not become accidentally dislodged from the block when the tool is in use.

In FIG. 3 the block carries the reference numeral 36, the tool carries numeral 38, and the sleeve is designated by numeral 40.

Figure 5:
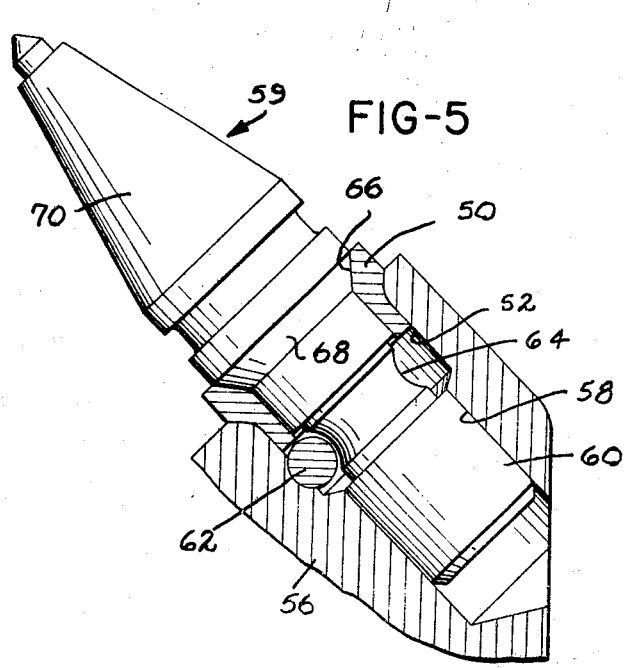
FIG. 5 is a fragmentary view similar to FIGS. 1 and 3 showing a modified construction of the tool support block.

FIG. 5 shows a relatively short insert 50 seated in counterbore 52 of bore 58 in block 56. Tool 59 has its shank 60 extending through insert 50 into the smaller diameter part of bore 54. Retaining pin 62 of block 56 extends loosely into groove 64 of shank 60 so as to retain the tool in the block while permitting free rotation of the tool in the block.

Insert 50 has seat portion 66 thereon which is engaged by tapered region 68 of the tool where shank 60 joins head 70. The insert in FIG. 5 is pressed or brazed in the counterbore in the block and may be of hard steel or carbide, preferably the latter.

Figure 6:
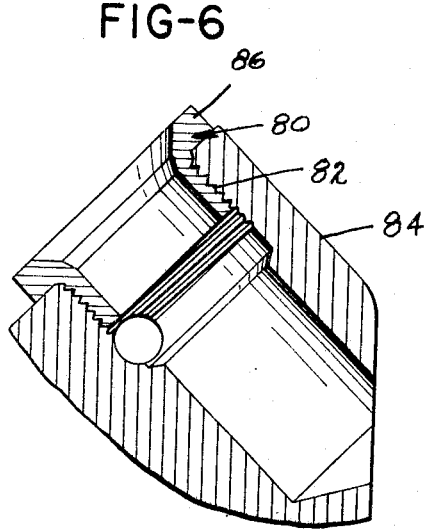
FIG. 6 is a fragmentary view showing still another modification of the tool support block.

In FIG. 6, a hardened steel insert 80 of about the same shape as insert 50 of FIG. 5 has threads 82 by means of which it engages block 84. Insert 80 of FIG. 6 is readily replaceable if it becomes worn because the outer end flange 86 of the insert which engages the end face of block 84 is formed to receive a wrench.

Where carbide inserts are employed, replaceability thereof is not a problem because the carbide will last for an indefinitely long time. Carbide inserts are, however, not difficult to replace by new inserts if this should become necessary.

Any of the tools in blocks shown could incorporate the pin as a retaining member or could incorporate a resilient keeper such as the split band with the protuberances thereon as a retaining member. When the split band is employed, it is usually supplied with the tool so when a tool is discarded the band thereon is discarded with it and a new band is inserted with the new tool.

It will be evident that the present invention is suscep-
tible of modification to adapt it to particular circumstances.

What is claimed is:

1. The combination, in a pick-type mining tool having a conical head and a cylindrical shank coaxial with the head and a support block therefor having a cylindrical bore for receiving said shank; of a tapered seat engaging portion on the tool at the juncture of said head and shank having side walls convergent toward the shank end of the tool, retaining means including keeper means for detachably holding said shank in said bore while permitting free rotation of the tool in said block, and a hard wear resistant sleeve-like insert of cemented metal carbide fixed in said bore in the region of the mouth end thereof, said insert having a tapered seat formed thereon complementary in shape to the seat engaging portion on said tool, said insert including a cylindrical bore extending from said seat through the insert and surrounding at least a portion of the length of the said shank of said tool adjacent said seat.

2. The combination according to claim 1 in which said insert is press fitted into said bore.

3. The combination according to claim 1 in which said insert is brazed in said bore.

4. The combination according to claim 1 in which said insert comprises a flange at the outer end engaging the face of said block around the mouth of the bore in the block.

5. The combination according to claim 1 in which said retaining means includes an annular groove formed in said shank in the region thereof which is disposed inwardly of the inner end of said insert when said tool is mounted in said block and said keeper means comprises a pin removably mounted in said block and extending loosely through the groove in the shank of the tool mounted in said block, said groove being located substantially closer to the end of said shank remote from the mouth of said bore than it is to the said seat engaging portion of said tool, whereby the major portion of the length of said shank engages the hole in said insert.

6. The combination according to claim 1 in which said retaining means includes an annular groove in said shank which is disposed inwardly along the bore of said block from the inner end of said insert when said tool is mounted in said block, said keeper means comprising a split band of resilient material having protuberance means in the form of at least one protuberance thereon extending radially outwardly therefrom, said split band being disposed in the groove in said shank, said protuberance means engaging the inner end of said insert when said tool is mounted in working position in said block, said groove in said shank being of such a depth that the said band can be compressed therein to dispose the radially outer limits of said protuberance means within the radial limits of the bore in said insert so the tool can be inserted in and removed from the said block while the band remains on said shank.

7. The combination according to claim 6 in which said groove in the shank is located substantially closer to the end of said shank remote from the mouth of said bore than it is to the said seat engaging portion of said tool, whereby the major portion of the length of said shank engages the bore in said insert.

References Cited

UNITED STATES PATENTS

| 1,582,332 | 4/1926 | Brutus | 175—354 X |
| 3,342,532 | 9/1967 | Krekeler | 299—92 |
| 3,397,012 | 8/1968 | Krekeler | 299—86 |

ERNEST R. PURSER, Primary Examiner

U.S. Cl. X.R.

299—92